United States Patent [19]

Rosheim

[11] Patent Number: 4,729,253
[45] Date of Patent: Mar. 8, 1988

[54] WRIST ACTUATOR

[76] Inventor: Mark E. Rosheim, 1565 St. Paul Ave., St. Paul, Minn. 55116

[21] Appl. No.: 898,301

[22] Filed: Aug. 20, 1986

Related U.S. Application Data

[63] Continuation-in-part of Ser. No. 820,678, Jan. 21, 1986, Pat. No. 4,686,866.

[51] Int. Cl.⁴ .................. G05G 11/00; B25J 17/02; F16M 11/12
[52] U.S. Cl. .................................... 74/479; 74/98; 248/179; 464/109; 901/25; 901/29
[58] Field of Search ............... 74/5.41, 5.47, 98, 479; 248/179; 464/109, 125; 901/25, 28, 29

[56] References Cited

U.S. PATENT DOCUMENTS

| | | | |
|---|---|---|---|
| 75,364 | 3/1868 | Case | 464/109 |
| 1,325,702 | 12/1919 | Schelb | 464/125 X |
| 1,899,170 | 2/1933 | Wainwright | 464/125 |
| 2,771,779 | 11/1956 | Schaffer et al. | 74/5.47 X |
| 3,064,419 | 11/1962 | Ward | 74/98 X |
| 3,246,580 | 4/1966 | Huska | 92/120 |
| 3,267,745 | 8/1966 | Smead et al. | 74/5.41 X |
| 3,276,273 | 10/1966 | Baker | 74/5.47 |
| 3,405,406 | 10/1968 | Vykukal | 2/2.1 |
| 3,456,458 | 7/1969 | Dixon | 464/109 |
| 3,631,737 | 1/1972 | Wells | 74/469 |
| 3,739,923 | 6/1973 | Totsuka | 214/1 |
| 3,784,031 | 1/1974 | Niitu et al. | 214/1 |
| 3,912,172 | 10/1975 | Bolner | 239/265.35 |
| 3,973,469 | 8/1976 | Humen | 91/51 |
| 4,009,644 | 3/1977 | Higuichi et al. | 92/125 |
| 4,045,958 | 9/1977 | Wells | 60/325 |
| 4,046,262 | 9/1977 | Vykukal et al. | 214/1 |
| 4,068,536 | 1/1978 | Stackhouse | 74/417 |
| 4,107,948 | 8/1978 | Molaug | 64/2 |
| 4,194,437 | 3/1980 | Rosheim | 92/120 |
| 4,296,681 | 10/1981 | Rosheim | 92/122 |
| 4,353,677 | 10/1982 | Susnjara et al. | 414/735 |
| 4,522,555 | 6/1985 | Inoue et al. | 414/733 |
| 4,580,461 | 4/1986 | Sears et al. | 74/479 |
| 4,628,765 | 12/1986 | Dien et al. | 74/479 X |

FOREIGN PATENT DOCUMENTS

| | | |
|---|---|---|
| 0009447 | 4/1980 | European Pat. Off. |
| 2752236 | 7/1980 | Fed. Rep. of Germany |
| 3036116 | 5/1982 | Fed. Rep. of Germany |

OTHER PUBLICATIONS

"Robot Wrist Actuators," *Robotics Age*, Nov./Dec. 1982, pp. 15–22.

*Pictorial Handbook of Technical Devices*, by Pete Grafstein & O. Schwarz, published by the Chemical Publishing Company, Inc. of New York, pp. 16–17, 1971.

*Primary Examiner*—Allan D. Herrmann
*Attorney, Agent, or Firm*—Kinney & Lange

[57] ABSTRACT

The present invention includes a robot wrist actuator having a cylindrical housing with first and second housing wall portions coaxially disposed with respect to each other. First and second gimbal assemblies are included within the housing for pitch and yaw movement and are rotatably mounted to the housing. First and second linkages connect the first and second gimbal assemblies such that movement is transmitted from one gimbal assembly to another.

19 Claims, 11 Drawing Figures

4,729,253

WRIST ACTUATOR

CO-PENDING APPLICATION

This application is a continuation-in-part of an application entitled, "Compact Robot Wrist Actuator," which was filed on Jan. 21, 1986 under Ser. No. 820,678 now U.S. Pat. No. 4,686,866.

BACKGROUND OF THE INVENTION

1. Field of the Invention.

The present invention relates to mechanical joints and robot wrists and in particular relates to a robot wrist having simultaneous pitch-roll-yaw movement.

2. Description of the Prior Art.

Interest in robotics and the use of robots in industrial applications has greatly increased in recent years. One area in which the use of robots has become important is the replacement of humans in tasks that involve manual work, such as welding, material handling, paint spraying, and assembly. Many of these tasks require working in cramped spaces or performing complex maneuvers. To perform such tasks, a robot arm or wrist should be able to rotationally move in a range similar to a human wrist and at a dwell time acceptable for the particular task involved.

One article reviewing the development of robot arms and wrists is entitled, "Robot Wrist Actuators," *Robotics Age*, November/December 1982, pp. 15–22, and was written by the applicant of the present application. In the article, several characteristics are described that make robot wrists attractive. One characteristic is that a mechanical arm or wrist can be safely used in areas where there is a danger of explosion if the wrist is driven by hydraulic actuators. However, there are several disadvantages with the prior art robot arms and wrists. Some of the disadvantages are also enumerated in the above-mentioned article and include large and bulky mechanical joints, slow dwell time in some rotational directions and low mechanical efficiency.

A number of well known universal joints are illustrated and described on pages 16 and 17 of the *Pictorial Handbook of Technical Devices* by Pete Grafstein and O. Schwarz, published by the Chemical Publishing Company, Inc. of New York, 1971. Although rotational motion can be transmitted through the universal joints illustrated on pages 16 and 17, the universal joints cannot be used in operations for transmitting pitch, yaw and roll motion to an implement or tool member.

A rotary actuator mechanism is described in the Higuchi et al U.S. Pat. No. 4,009,644. However, the rotary actuator of the Higuchi et al Patent is not very useful for the transmission of pitch, yaw and roll motion to a tool or implement member.

A number of robot joints are illustrated in the Vykukal U.S. Pat. No. 3,405,406 and the Vykukal et al U.S. Pat. No. 4,046,262. The Vykukal patents describe hard-type space suits that permit the user inside the space suit to move around somewhat unrestricted.

The Bolner U.S. Pat. No. 3,912,172 describes a back-drivable, direct drive, hydraulically-actuated pitch and roll actuator.

The Rosheim U.S. Pat. No. 4,194,437 and 4,296,681, which were issued to the applicant of the present application, describe hydraulic servomechanisms which impart rotary movements to a device to be driven.

The Stackhouse U.S. Pat. No. 4,068,536 describes a remotely-driven, mechanical manipulator. The manipulator is controlled by three concentric drive shafts which terminate in a spherically-spaced wrist mechanism.

The Totsuka U.S. Pat. No. 3,739,923 and the Niitu et al U.S. Pat. No. 3,784,031 describe a manipulator arm having two parallel rotating drive shafts in a beveled gear system which translates the drive shaft's rotating motion to a bending pitch motion and rotary roll motion in a tool member.

A mechanical wrist is described in German Pat. No. 2,752,236 that includes three electric motors, providing pitch, yaw, and roll, which are mounted on the outside of a housing with the inside of the housing being hollow. The wrist is used for holding welding tongs and the hollow inside housing permits electrical power lines to be fed through the wrist.

The Molaug U.S. Pat. No. 4,107,948 describes a flexible robot arm that is composed of a number of mutually connected rigid links being connected at one end to a drive means and at the other end to a tool member that is to be rotated. Another robot arm is illustrated in the Wells U.S. Pat. No. 3,631,737. The robot arm of the Wells Patent includes a plurality of rigid tubular sections joined end-to-end by flexible joints to form an articulated arm. The rigid sections are manipulated by slender control cables which are attached to the respective sections and selectively extend and retract.

SUMMARY OF THE INVENTION

The present invention includes a robot wrist actuator that provides simultaneous pitch, yaw and roll movement with singularity-free motion, high precision and back-drivability for walk-through programming. The wrist actuator includes a housing having first and second housing wall portions coaxially disposed with respect to each other and first and second gimbal assemblies disposed within the housing and rotatably attached to the housing. First and second linkage means movably connect the first and second gimbal assemblies and transmit movement between the first and second gimbal assemblies.

First and second linearly activated rods are pivotally connected to the first and second linkage means, respectively, and when linearly actuated, provide pitch and yaw movement to the wrist of the present invention. Roll movement is provided by a central support shaft connected to one of the gimbal assemblies rotatably moving both gimbal assemblies within the housing.

In one embodiment, linear motors provide rotational movement to the central support staff and flexible wiring is provided to supply power to the motors without interfering with roll movement.

DETAILED DESCRIPTION OF THE PREFERRED EMBODIMENTS

Figure 1:
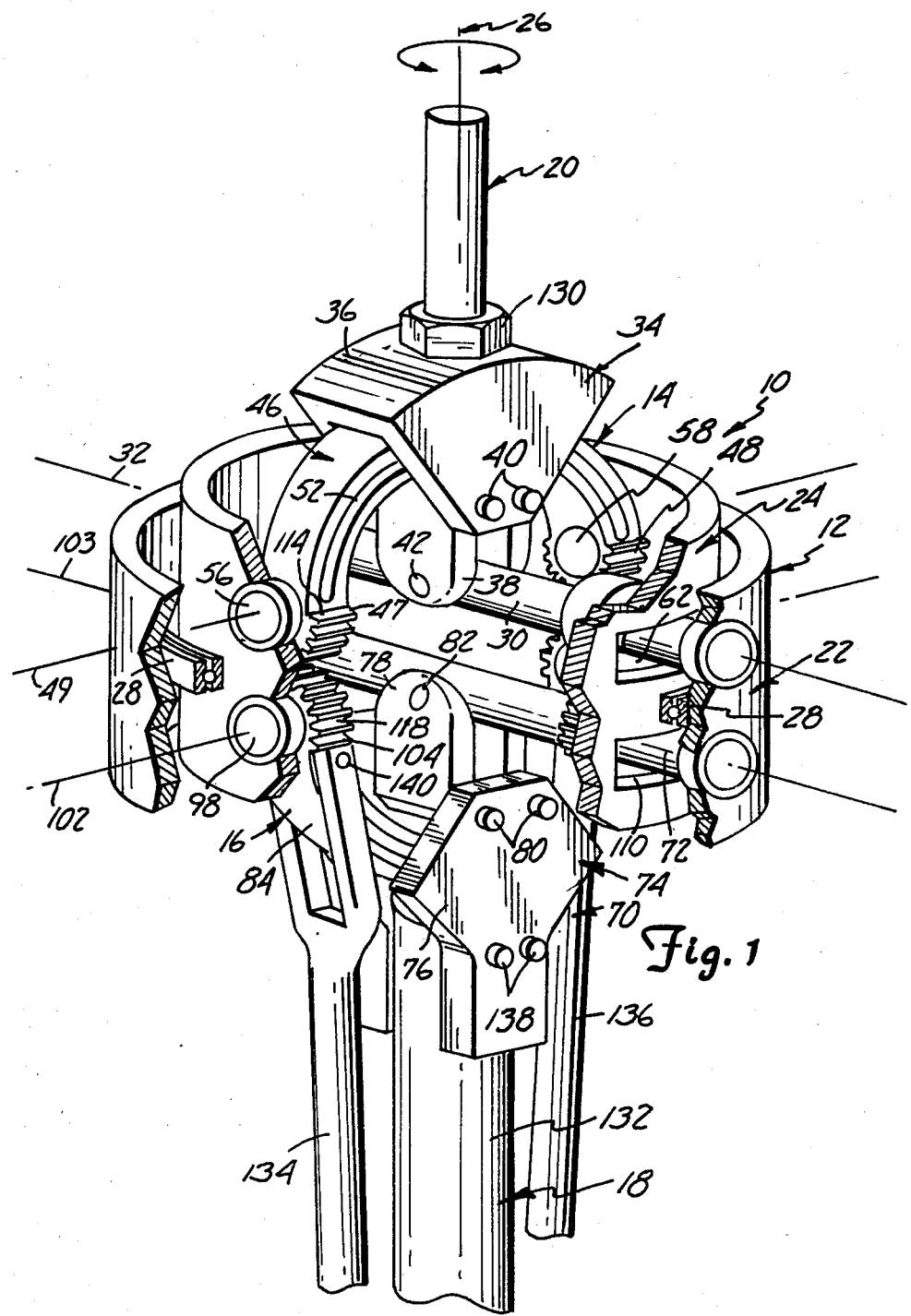
FIG. 1 is a perspective view of the apparatus of the present invention with portions broken away for purposes of clarity.

A robot wrist actuator of the present invention is generally indicated at 10 in FIG. 1. Throughout the figures and embodiments, like reference characters will be used to indicate like elements. The robot wrist actuator 10 of the present invention includes a housing 12, a first gimbal assembly 14, a second gimbal assembly 16, a drive train mechanism generally indicated at 18, and a tool-carrying member 20.

The housing 12 includes a first or outer housing wall portion 22 and a second or inner housing wall portion 24. The housing wall portions 22 and 24 are coaxially disposed with respect to one another along a central axis 26 that extends through the wrist actuator 12 of the present invention. The housing wall portion 22 and 24 are rotatable with respect to each other about the axis 26 by a bearing 28 disposed between the wall portions 22 and 24. The bearing 28 retains the wall portions with respect to each other and permits relative movement between the wall portions.

The first, or forward gimbal assembly 14 includes a rotatable shaft 30 disposed substantially perpendicularly to the primary axis 26 along a rotation axis 32. A forward clevis assembly 34 includes a forward yoke 36 and a forward clevis 38. The yoke 36 is fixedly attached to the clevis 38 such as by screws 40 and is disposed at right angles to the clevis 38 such that the portion where the arms of the clevis 38 meet is disposed between the arms of the yoke 36. The arms of the clevis 38 are pivotally attached to the shaft 30 proximate their respective ends by a pin 42, as best illustrated in FIG. 2.

A passage 44 is defined between the clevis 36 and the clevis 38. A bail 46 is disposed within the passage 44. The bail 46 is generally arcuate and is curved about the shaft 30 and inwardly into the housing. The bail has gear end portions 47 and 48. The gear end portions 47 and 48 are preferably spur gears.

Figure 4:
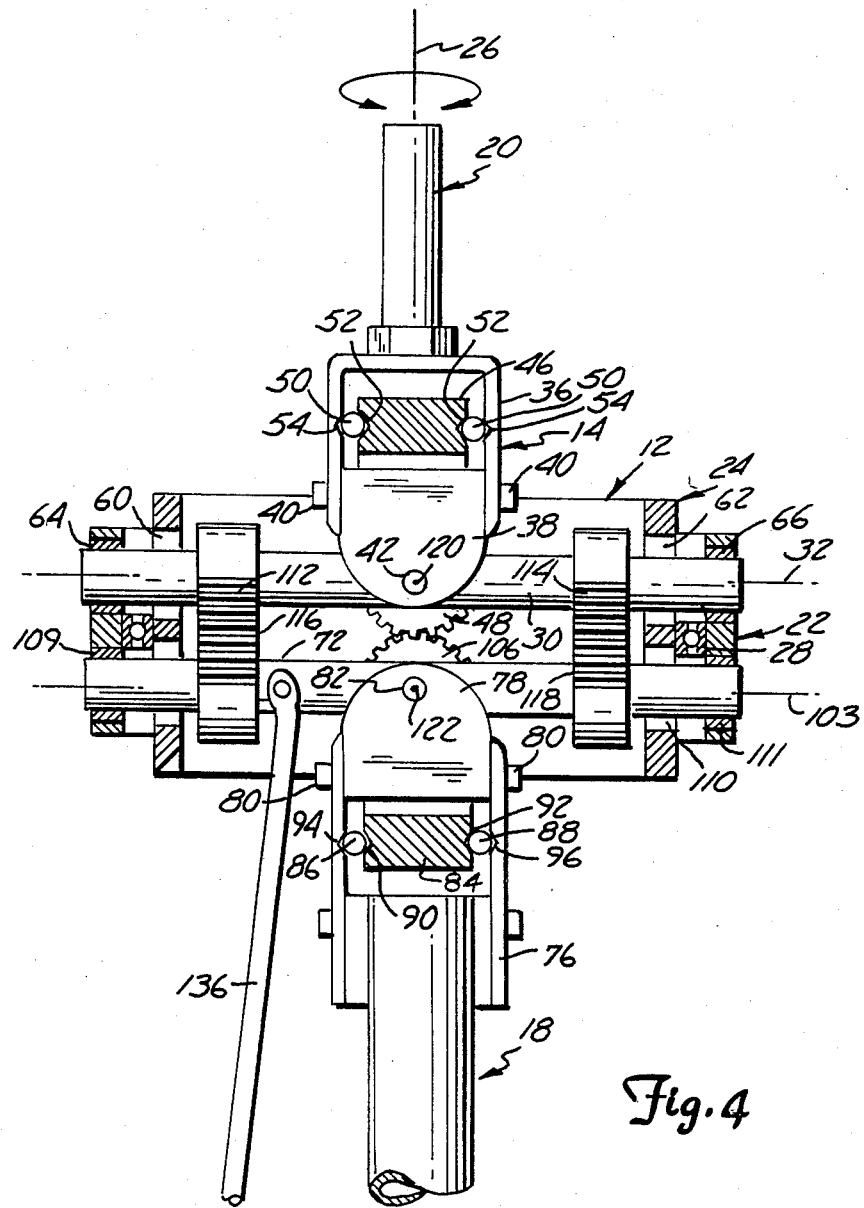
FIG. 4 is a sectional view illustrating the gimbal assemblies in an extended yaw position.

The bail 46 cooperates with the clevis assembly 14 through bearings 50, as best illustrated in FIG. 4. The bearings 50 ride in a tracks 52 located on opposing sides of the bail 46 and tracks 54 located on opposing inner surfaces of the arms of the yoke 36.

Figure 2:
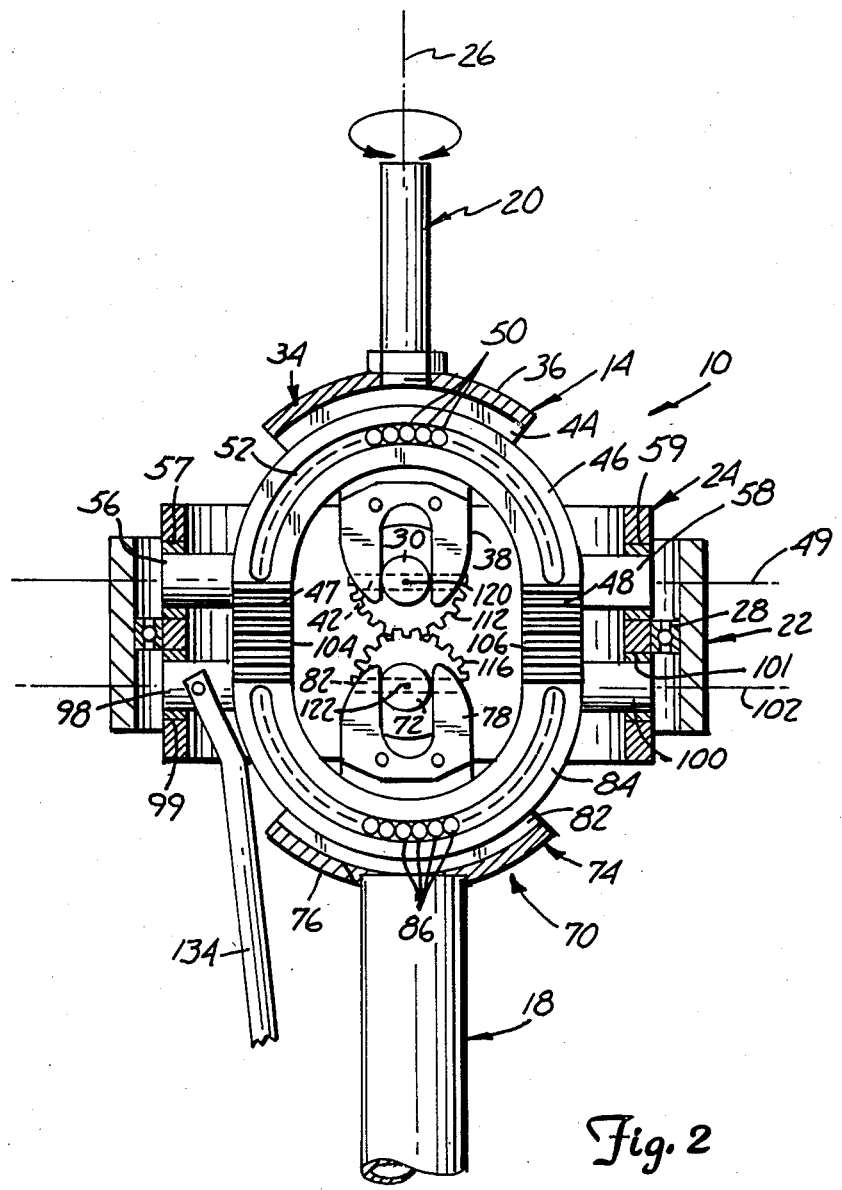
FIG. 2 is a sectional view of the apparatus of FIG. 1 illustrating the gimbal assemblies in an extended pitch axis position.

The bail 46 is rotatably connected to the inner wall portion 24 through pins 56 and 58, which connect the gear end portions 47 and 48 to the inner wall portion 24, as best illustrated in FIGS. 1 and 2 and permit the bail to pivot about axis 49. The pins 56 and 58 pivot within bushings 57 and 59, respectively.

The shaft 30 is also rotatably mounted within the housing 12 and extends through slots 60 and 62 of the inner wall portion and is rotatably connected to the outer wall portion 22 by bushings 64 and 66. The slots 60 and 62 extend along the inner wall portion 24 approximately one quarter of the circumference of the inner wall portion.

A second or rearward gimbal assembly 70 is also disposed within the housing 12. In most respects, the second gimbal assembly is a mirror image of the first gimbal assembly 14 and includes a shaft 72 disposed substantially perpendicularly to the axis 26 and substantially parallel to the shaft 30. The gimbal assembly further includes a clevis assembly 74 having a rearward yoke 76 and a rearward clevis 78. The yoke 76 is fixedly attached to the second clevis 78 preferably by screws 80. The second clevis 78 is pivotally attached to the shaft 72 by a pin 82, as best illustrated in FIGS. 1 and 2.

The yoke 76 and the clevis 78 are disposed at right angles with each other with the clevis 78 being disposed between the arms of the yoke 76. A passage 82 is defined between the arms of the yoke 76 and the clevis 78, as best illustrated in FIG. 2. A bail 84 is disposed within the passage 82. The bail 84 is similar to the bail 46 and is generally arcuate and is curved about the shaft 72 and inwardly into the housing. The bail 84 cooperates with the yoke 76 through bearings 86 and 88 that ride in tracks 90 and 92 located on opposing sides of the bail 84 and tracks 94 and 96 located on opposing inner surfaces of the arms of the yoke 76, as best illustrated in FIGS. 1 and 4.

Figure 11:
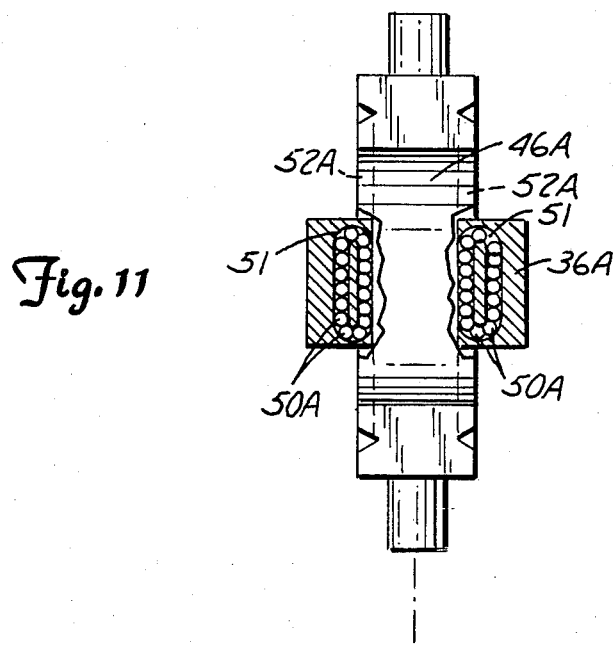
FIG. 11 is a sectional view of the gimbal assembly of the embodiment of FIG. 1 with the bail shown whole for purposes of clarity.

An alternative embodiment of a bail/yoke assembly is illustrated in FIG. 11. A bail 46A has tracks 52A disposed on opposing sides of the bail. A yoke 36A is in sliding cooperation with the bail 46A by bearings 50A which ride in tracks 51 disposed in the yoke 36A and which travel between the tracks 51 and the tracks 52A in an endless pathway as the yoke slides with respect to the bail.

The bail 84 is rotatably attached to the inner wall portion 24 by pins 98 and 100 through bushings 99 and 101, respectively, as best illustrated in FIG. 2, for rotation about axis 102. The axes 49 and 102 are substantially parallel with each other. The bail 84 includes gear end portions 104 and 106 which cooperate with the gear end portions 47 and 48 of the bail 46.

The shaft 72, similar to the shaft 30, is rotatably mounted within the housing 12 along axis 103. The shaft 72 extends through slots 108 and 110 of the inner wall portion 24 and is rotatably attached to the outer wall portion 22 by bushings 109 and 111. The slots 108 and 110 each extend approximately one quarter of the circumference of the inner wall portion. The shafts 72 and 30 cooperate through gears 112 and 114, fixedly attached to the shaft 30, and gears 116 and 118, fixedly attached to the shaft 72.

The gimbal assemblies 14 and 70 each pivot about common respective center points 120 and 122, as illustrated in FIGS. 2-5. The center points 120 and 122 are located along the axis 26 when the device of the present invention is in an extended position.

Figure 3:
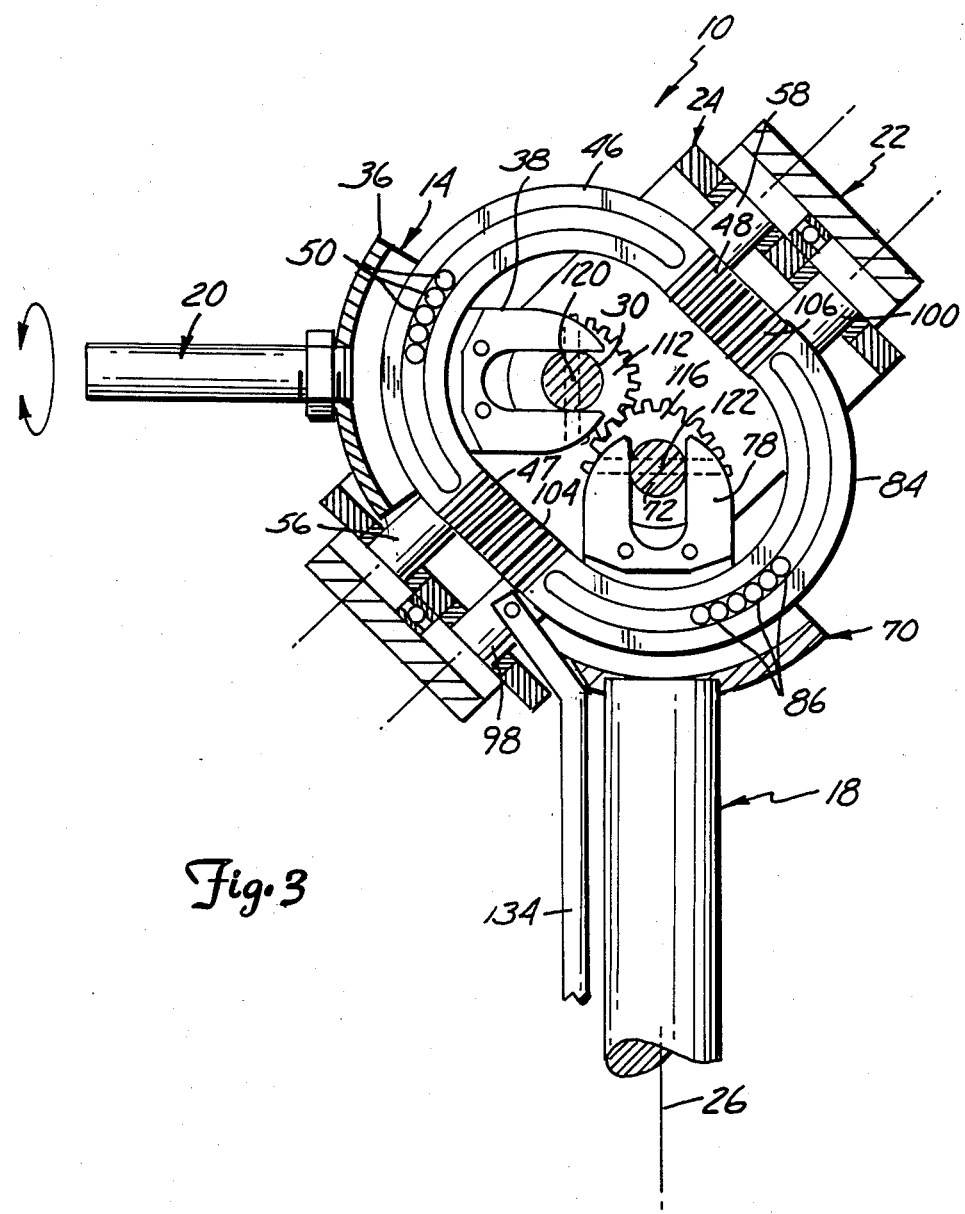
FIG. 3 is a sectional view similar to the view of FIG. 2 illustrating the gimbal assemblies in a rotated pitch axis position.

The movement of the wrist actuator of the present invention along the yaw axis is illustrated by referring first to FIG. 2 and then to FIG. 3. As the yoke 36 is moved to one side, the gears 112 and 116 cooperate such that the gimbal assemblies 14 and 70 move relative to the bails 46 and 84, respectively, by cooperation through the bearings 50 and 86. In addition, the bails 46 and 84, by virtue of the cooperation of gears 112 and 116, also rotate such that the tool-carrying member 20 is moved from a position along axis 26 to as far as a position substantially at right angles to axis 26.

Figure 5:
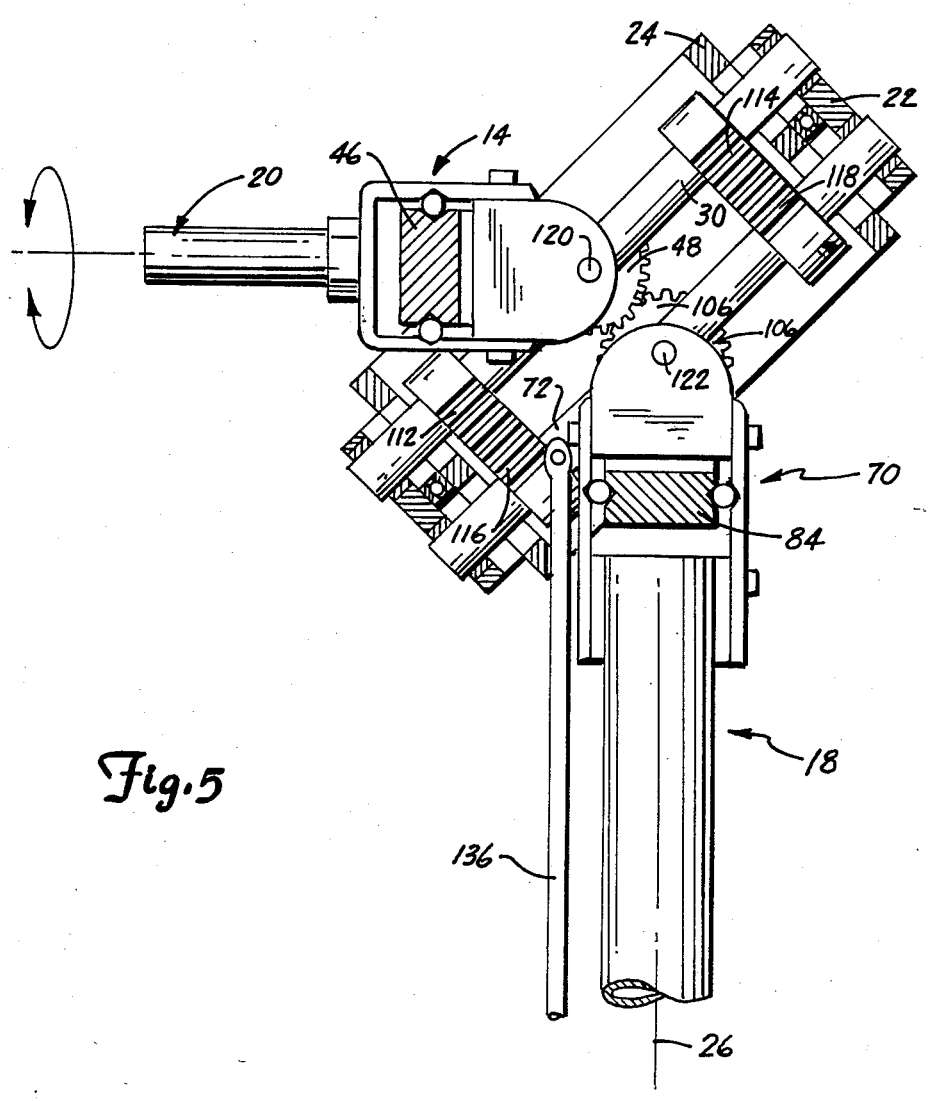
FIG. 5 is a sectional view similar to the view of FIG. 4 with the gimbal assemblies in a rotated yaw axis position.

The movement along the pitch axis is illustrated by referring first to FIG. 4 and then to FIG. 5. When the gimbal assembly 14 is moved, movement along the pitch axis is permitted by pivoting of the clevis assemblies along the center points 120 and 122 with movement being translated from one gimbal assembly to the other gimbal assembly through gears 48 and 106 and gears 47 and 104. As illustrated in FIG. 5, the tool member is movable from a position along the axis 26 to as far as a position substantially perpendicular to the axis 26.

To move the wrist actuator of the present invention in a compound pitch/yaw motion, the inner housing is rotated about the bearing 28 relative to the outer housing with the shafts 30 and 72 decoupling from their original position. By decoupling is meant that the shafts 30 and 72 move along the slots 62 and 110.

It should be understood that the outer housing wall portion 22 is not needed to retain the gimble assemblies 14 and 16 in a cooperative manner and to function. The gimble assemblies 14 and 16 will function in a suitable manner by their pivotal attachment to the inner housing wall portion 24 through pins 56, 58, 98 and 100. The outer wall portion 24 provides a support to the wrist actuator of the present invention so that the tool-carrying member is provided with a more rigid support when this type of support is needed for a particular application. The tool-carrying member is movable to virtually any position along a hemisphere and is fully supported in any position that the tool-carrying member is moved.

The tool-carrying member 20 is fastened to the gimbal assembly 14 in any secure manner. For illustrative purposes, the member 20 is secured to the gimbal assembly 14 by threadably engaging a nut 130 that is fixedly attached to the yoke 36. The member 20 represents any desired tool that is positionable by a robot wrist. Such tools include sanding disks, grippers, probes, paint guns and the like. It should be understood that the tool can also be part of or integral with the yoke 36.

The drive train 18 that provides movement to the wrist of the present invention includes a central wrist support tubular shaft 142, a yaw axis push-pull rod 134 and a pitch axis push-pull rod 136. The central support tube 142 provides support for the wrist and rotational movement about the axis 26. The push-pull rod 134 is pivotally attached to the bail 84 by pivot pin 140 and provides motive force for movement about the yaw axis. The push-pull rod 136 is pivotally attached to the shaft 72 by pin 42 and provides motive force for movement about the pitch axis.

Figure 6:
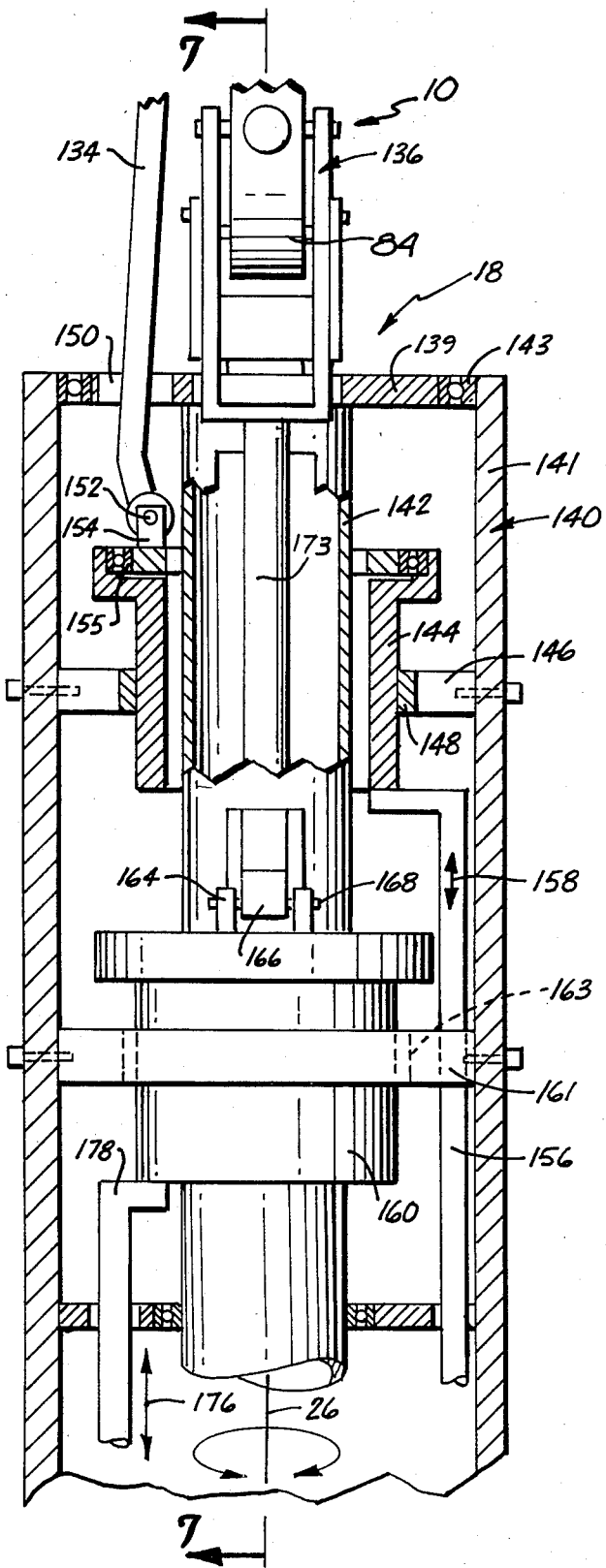
FIG. 6 is a sectional view along a plane of the pitch axis illustrating one embodiment of the drive train of the present invention for providing movement to the wrist actuator.
Figure 7:
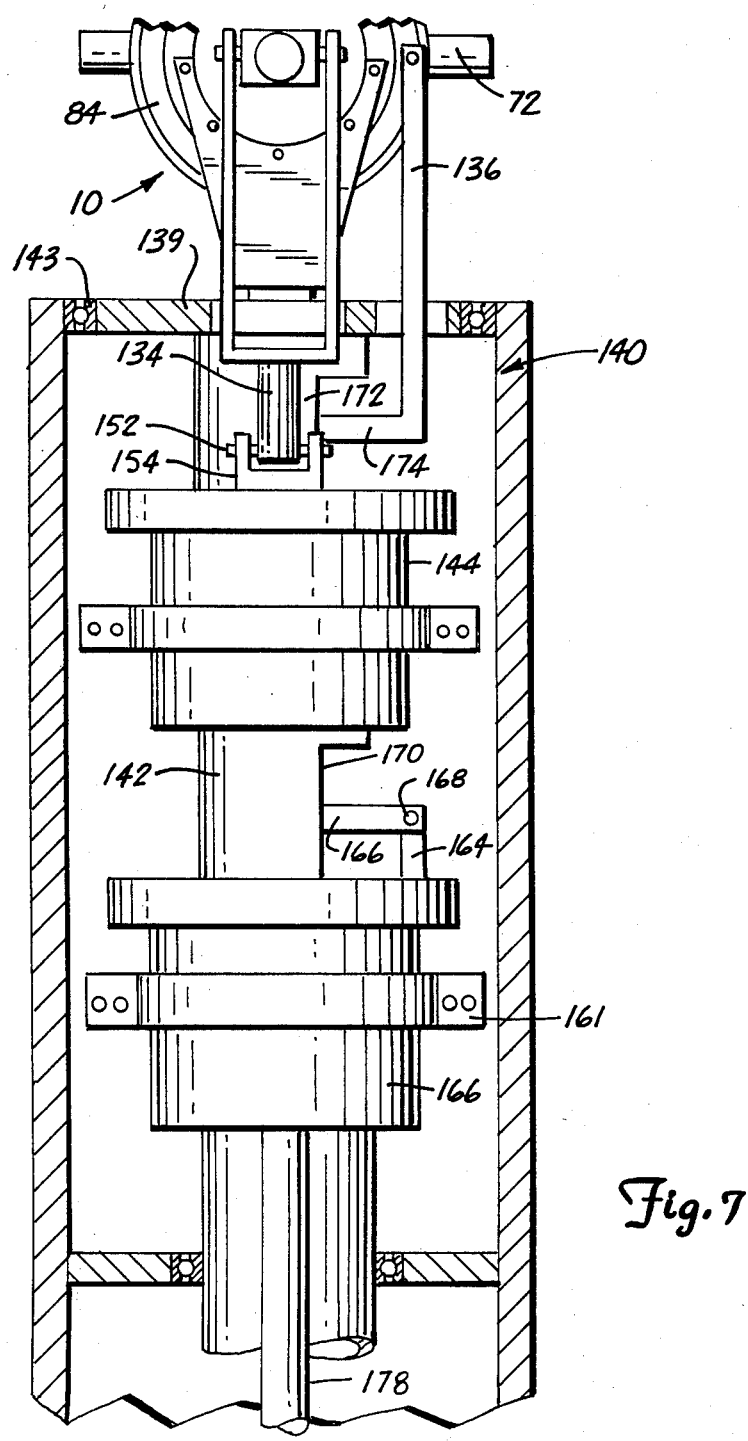
FIG. 7 is a sectional view of the drive train of FIG. 6 along a plane of the yaw axis.

In FIGS. 6 and 7, the drive train 18 is more fully illustrated. The drive train 18 includes a housing 140 having a top plate 139 and a tubular wall 141. A bearing 143 is disposed between the plate 139 and the wall 141. The central support shaft 142 extends longitudinally within the housing 140 and is disposed for rotation about the axis 26 which is permitted by bearing 143.

A first forward sleeve 144 is coaxially disposed about the shaft 142 and the axis 26. The sleeve 144 is retained within the housing 40 by cooperation with a flange 146 extending inwardly from an inner wall of the housing 140. The bushing 148 is disposed between the flange 146 and the sleeve 144 so that sliding movement of the sleeve 144 along the axis 26 is permitted.

The push-pull rod 134 passes through an opening 150 in the housing 140 and is connected by a cross pin 152 to a clevis 154 that rests on the sleeve 144. A bearing 155 is disposed between the sleeve 144 and the clevis 154 so that rotational movement of the shaft 142 along with the push/pull rod 134 is permitted, as best illustrated in FIG. 6.

A rod 156 extends through the bottom rear portion of the housing and is rigidly connected to the sleeve 144. The rod 156 is movable in a direction parallel to the axis 26, as indicated by arrows 158 so that linear movement is transmitted to the sleeve 144, to the push-pull rod 134 and to the bail 84, for providing yaw movement, as previously described.

Linear motive force to the push-pull rod 136 is provided by sleeve 160 which is similar in construction to sleeve 144. The sleeve 160 is coaxially disposed about the shaft 142. The sleeve 160 is retained coaxially about the tube 142 by a flange 161. A bushing 163 is disposed between the flange 161 and the sleeve 160 for permitting movement of the sleeve 160 along the axis 26.

The push-pull rod 136 includes a portion 174 disposed approximately perpendicularly to the axis 26. The portion 174 extends through an opening 172 in the tube 142. A second portion 173 extends longitudinally through the tube 142, as best illustrated in FIG. 6. A third portion 166 of the push-pull rod 136 is disposed approximately perpendicularly to the axis 26 and extends out from the tube 142 through opening 170 and is attached to a clevis 164 by pin 168. The clevis 164 rests on the sleeve 160. The portions 174, 173 and 166 are integral with each other and part of the push-pull rod 136. A bearing (not shown), similar to bearing 155, is disposed between the clevis 164 and the sleeve 160 so that rotational movement of the tube 142, along with the push-pull rod 136, is permitted. Pitch axis movement is initiated along the direction of arrows 176, as best illustrated in FIG. 6, by a lower rod 178 being rigidly attached to the tube 160.

As is understood from the above description, roll rotation can be transmitted to the wrist actuator 10 independently of movement of the push-pull rod 134 and 136 by decoupling of the housing 140 through bearings 143, 155 and the bearing between sleeve 160 and clevis 164 (not shown). Similarly, movement of the push-pull rod 134 is accomplished independently and without interference from movement of the push-pull rod 136 or rotational movement of the shaft 142. Likewise, movement of the push-pull rod 136 is accomplished without interference of movement of the push-pull rod 134 or rotational movement of the shaft 142.

Figure 8:
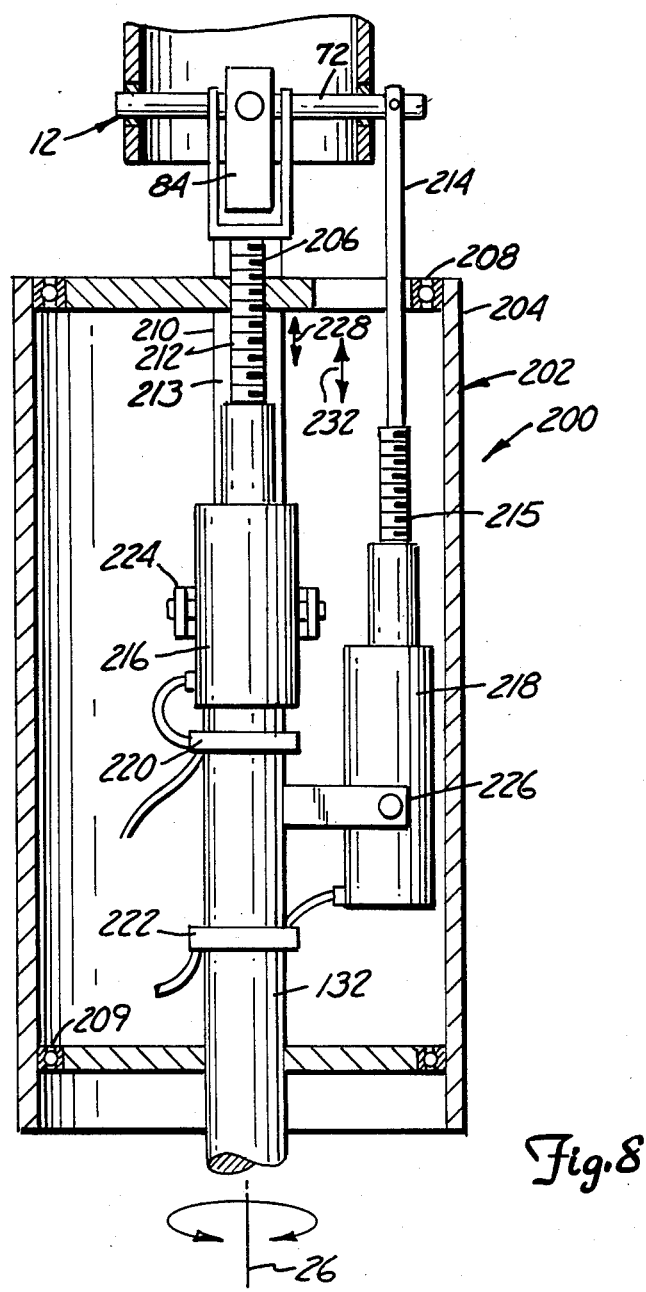
FIG. 8 is an elevational view illustrating an alternative embodiment of a drive train along a plane of the yaw axis.

An alternative embodiment 200 of the drive system is illustrated in FIG. 8. The embodiment 200 includes a housing 202 having a tubular side wall 204, a top plate 206 and a bottom plate 207. A bearing 208 is disposed between the top plate 206 and the tubular wall 204 and a bearing 209 is disposed between the bottom plate 207 and the tubular wall 204. The drive system 200 is similarly attached to the wrist actuator 10 of the present invention as the previously described drive system 140. A central shaft 210 is attached to the rear yoke for rotational movement. A push-pull rod 212, similar to rod 134, is pivotally attached to the bail 84 for movement about the yaw axis and a push-pull rod 214 pivotally attached to the rearward shaft 72. The push-pull rods 212 and 214 are actuated by motors 216 and 218, respectively. The motors 216 and 218 are preferably electric motors with electrical power being supplied via commutators 220 and 222. The commutators 220 and 222 are attached to a central hollow shaft 210. The motors 216 and 218 are also attached to the shaft 210 by clevises 224 and 226, respectively.

The push-pull rods 212 and 214 move in a direction as indicated by arrows 228 and 230, respectively. The push-pull rods 212 and 214 actuate the wrist actuator 212 in substantially the same manner as rods 134 and 136, described previously. The rods 212 and 214 are moved by threaded ends 213 and 215, respectively, being moved in and out by the motors 216 and 218 to move the push-pull rods 212 and 214 in the direction of arrows 228 and 204, respectively.

For rotational movement, the hollow shaft 210 is also actuated about the axis 26 by a motor (not shown). The rotation of the shaft is permitted due to decoupling of the top plate 206 from the hollow tube 204 through the bearing 208 and decoupling of the bottom plate 207 through the bearing 209.

Figure 9:
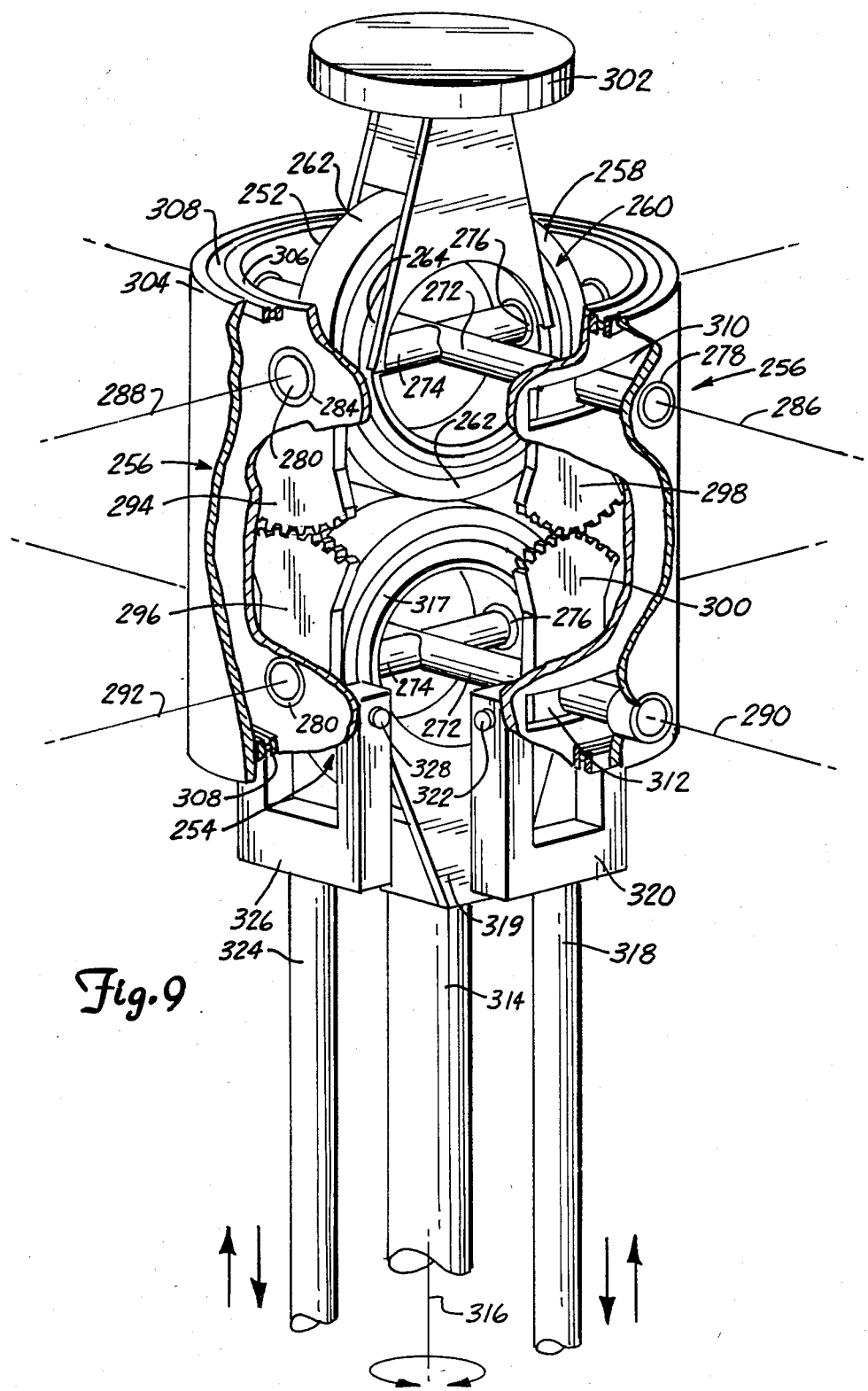
FIG. 9 is a perspective view of an alternative embodiment of the present invention.

In FIG. 9, an alternative embodiment of the wrist actuator of the present invention is generally indicated at 250. The wrist actuator 250 is similar to the wrist actuator described in application Ser. No. 600,016, filed on Apr. 12, 1984, by the applicant of the present application, the contents of which are incorporated herein by reference.

Specifically, the embodiment 250 has a first forward bearing assembly 252 and a second rearward bearing assembly 254 disposed in a housing 256. The bearing assemblies 252 and 254 are similarly constructed and will be described with reference to FIG. 10 where bearing assembly 252 is illustrated in a cross-sectional view. The bearing assembly 252 includes a bearing 260 that has an outer race member 262 and an inner race member 264 with bearings 266 disposed between the inner and outer race members are movable with respect to each other. An inner pivotal member 268 which has a first pivotal rod member 270 and a second pivotal rod member 272 fixedly attached to the member 270 and disposed perpendicularly thereto. The member 270 is pivotally attached to the inner race member 264 by bushings 274 and 276. The member 272 is pivotally attached to the housing by bushings 278, only one of which is illustrated. The outer race member 262 is attached to the housing by pins 280 and 282 which are fixedly attached to the outer race member 262 on opposing sides. The pins 280 and 282 are pivotally attached to the housing by bushings 280, only one of which is shown in FIG. 9.

Rod member 272 lies along an axis 286 and the rod member 274 lies along an axis 288 which is substantially perpendicular to the axis 286.

The bearing assembly 254, as previously stated, is similar in construction to the bearing assembly 252 and is also pivotally attached to the housing in a like manner with rod member 272 lying along an axis 290, which is substantially parallel to the axis 286 and rod member 274 lying along an axis 292 which is substantially parallel to the axis 288.

Figure 10:
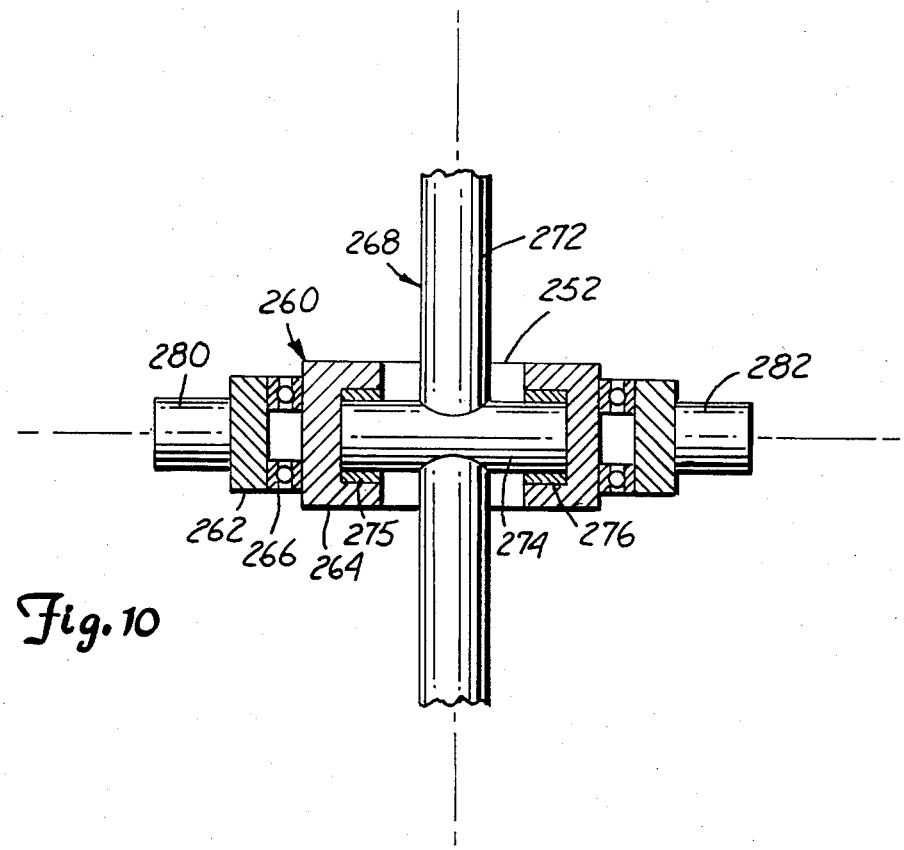
FIG. 10 is a sectional view of a bearing assembly of FIG. 9 with portions shown whole for purposes of clarity.

Motive force is transferred between the first and second bearing assemblies 252 and 254 via cooperating pairs of spur gears 294 and 296 (only one of each pair shown) and spur gears 298 and 300 (only one of each pair shown). One spur gear 294 is fixedly attached to the pin member 280 and the other spur gear 294 (not shown) is attached to the pin member 282, which is illustrated in FIG. 10 and not illustrated in FIG. 9. The spur gear 296 is also fixedly attached to the pin 280 of the bearing assembly 254 and cooperates with the spur gear 294. Similarly, the other spur gear 296 (not illustrated) is fixedly attached to the pin 282 of the bearing assembly 254 and cooperates with the other spur gear 294 that is not illustrated.

Each of the spur gears 298 are fixedly attached to the shaft 272 proximate opposite ends of the shaft 272, that is, on opposite sides of the bearing assembly. Similarly, the spur gears 300 are fixedly attached to the shaft 272 of the bearing assembly 254 on opposite ends of the shaft 272 on opposing sides of the bearing assembly. The spur gears 298 and 300 cooperate with each other to transfer motive force between the bearing assemblies 252 and 254 in a like manner as described with reference to the spur gears attached to the shafts 30 and 72 of the wrist actuator 10.

A tool-carrying member 302 is fixedly attached to the inner race member 262 of the bearing 252. The tool-carrying member 302, although shown in a different configuration than the tool-carrying member 20 of FIGS. 1–5, is in all respects the same regarding its movement.

The housing 256 is similar to the housing 12 of FIGS. 1–5 and includes an outer housing wall portion 304 and an inner housing wall portion 306 with bearings 308 disposed therebetween to permit rotational movement of the bearing assemblies 252 and 254. The inner housing wall portion 306 has a pair of first forward slots 310 on opposing sides through which the ends of the rod members 272 extend. A second rearward pair of slots 312 are also included in the inner housing wall portion 306 through which opposing ends of the rod member 272 of the bearing assembly 254 extend. The slots 310 and 312 serve the same purpose as the slots 62 and 110 of the embodiment 10 of FIGS. 1–5, that is, for decoupling of the bearing assemblies 252 and 254 for compound pitch/yaw movement.

Motive force is supplied to the embodiment 250 via a central support and rotational shaft 314 for rotation about an axis 316, a push-pull rod 318 pivotally attached to the rod member 272 by a clevis 320 and pin 322 arrangement, and a push-pull rod 324 pivotally attached to the outer race member of the bearing assembly 254 via a clevis 326 and pivot pin 328 arrangement. The shaft 314 is fixedly attached to an inner race member 317 of the bearing assembly 254 through a yoke portion 319 of the shaft 314. It will be appreciated that the movement of the shaft 314, the push-pull rod 318 and the push-pull rod 324 are the same as the shaft 18 and push-pull rods 136 and 134 of the embodiment 10 of FIGS. 1–5. Drive systems as described with reference to FIGS. 6–9 are suitable for providing motive force to the embodiment 215 in a similar manner as was explained with reference to FIGS. 1–5.

Although the present invention has been described with reference to preferred embodiments, workers skilled in the art will recognize that changes may be made in form and detail without departing from the spirit and scope of the invention.

What is claimed is

1. A mechanical joint comprising:
   a housing structure rotatable about a first axis;
   first and second gimbal assemblies pivotally attached to the housing structure and each gimbal assembly having an articulation point along the first axis when the joint is in a first position; and first and second linkage means for transmitting selective movement from the first gimbal assembly to the second gimbal assembly such that the second gimbal assembly is movable in a selected sequence.

2. The mechanical joint of claim 1 and wherein each gimbal assembly comprises:
   a shaft rotatably mounted to the housing structure and disposed perpendicularly to the first axis;
   bail means for transmitting motion to a bail means of the other gimbal assembly, the bail means being rotatably mounted within the housing means; and
   a clevis assembly having a passage through which the bail means extends, the clevis assembly being pivotally attached to the shaft, the shaft having means for transmitting rotational movement to another shaft of the other gimbal assembly such that rotational movement of one shaft is transmitted to the other shaft and rotational movement of one bail is transmitted to the other bail.

3. The joint of claim 2 wherein each bail has two ends and each end has a gear end portion for transmitting rotational movement from one bail to the other bail.

4. The joint of claim 2 wherein the means for transmitting rotational movement from one shaft to the other is a gear shaft portion.

5. The joint of claim 2 and further including bearing means disposed on opposing sides of the bail means within the passage of the clevis assembly, slidably connecting the bail means with the clevis assembly.

6. The joint of claim 2 and further including drive means having means for supplying rotational motion to the bail means of the first gimbal assembly, means for supplying rotational motion to the shaft of the first gimbal assembly and means for supplying rotational motion to the first gimbal assembly about the first axis.

7. A mechanical joint comprising:
   housing means having first and second housing wall portions coaxially disposed with respect to each other along a first axis;
   bearing means retaining the housing portions relative to each other and permitting relative rotational movement of the housing wall portions;
   first and second gimbal assemblies pivotally attached to the housing means and each gimbal assembly having a center point on the first axis when the joint is in a first position; and
   first and second linkage means movably connecting the first and second gimbal assemblies for transmitting movement between the first and second gimbal assemblies such that the gimbal assemblies are movable angularly between the first position and a second position and wherein the first and second gimbal assemblies are rotatable about the first axis through movement of the first housing wall portion with respect to the second housing wall portion.

8. The mechanical joint of claim 7 and wherein each gimbal assembly comprises:
   a shaft rotatably mounted to the housing means and disposed perpendicularly to the first axis;
   bail means for transmitting motion to a bail means of the other gimbal assembly, the bail means being rotatably mounted within the housing means; and
   a clevis assembly having a passage through which the bail means extends, the clevis assembly being pivotally attached to the shaft, the shaft having means for transmitting rotational movement to another shaft of the other gimbal assembly such that rotational movement of one shaft is transmitted to the other shaft and rotational movement of one bail is transmitted to the other bail.

9. The joint of claim 8 wherein each bail has two ends and each end has a gear end portion for transmitting rotational movement from one bail to the other bail.

10. The joint of claim 8 wherein the means for transmitting rotational movement from one shaft to the other is a gear shaft portion.

11. The joint of claim 8 and further including bearing means disposed on opposing sides of the bail means within the passage of the clevis assembly, slidably connecting the bail means with the clevis assembly.

12. The joint of claim 8 wherein each shaft of each gimbal assembly extends through a slot in the first housing wall portion and is rotatably connected to the second housing wall portion.

13. The joint of claim 8 and further including drive means having means for supplying rotational motion to the bail means of the first gimbal assembly, means for supplying rotational motion to the shaft of the first gimbal assembly and means for supplying rotational motion to the first gimbal assembly about the first axis.

14. The joint of claim 13 wherein the means for supplying rotational motion to the bail is a first rod member pivotally attached to the bail of the first gimbal assembly, wherein the means for supplying rotational motion to the shaft of the first gimbal assembly is a second rod member pivotally attached to the shaft of the first gimbal assembly and wherein the means for supplying rotational motion to the first gimbal assembly includes a third rod member attached to the first gimbal assembly for transmission of rotational motion to the first gimbal assembly.

15. The joint of claim 14 wherein the drive means further includes first and second sleeves disposed coaxially about the third rod member and in sliding relationship with respect to the third rod member along the first axis with the first rod member being pivotally attached to the first sleeve and the second rod member being pivotally attached to the second sleeve such that when either the first or second sleeve is moved along the first axis, either the first or second rod member is movable independently of each other and independently of the third rod member.

16. The joint of claim 14 wherein the drive means further includes first, second and third electric motors for actuating the first, second and third rod members, respectively.

17. A drive mechanism for providing motive force to a mechanical joint having first and second gimbal assemblies, each gimbal assembly having means for moving the gimbal assembly about a pitch axis, means for moving the gimbal assembly about a yaw axis, and means for permitting the gimbal assembly to rotate about a first axis, the drive mechanism comprising:
   a first rod member pivotally attached to the first gimbal assembly for providing motive force to the first gimbal assembly for movement about the pitch axis;
   a second rod member pivotally attached to the first gimbal assembly for providing motive force to the first gimbal assembly for movement about the yaw axis; and
   a third rod member attached to the first gimbal assembly or providing rotational motive force to the first and second gimbal assembly.

18. The joint of claim 17 wherein the first means for supplying motive force includes a first sleeve disposed coaxially about the third rod member and wherein the second means for providing motive force includes a second sleeve coaxially disposed about the third rod member, both first and second sleeves disposed along the first axis with the first rod member being pivotally attached to the first sleeve and the second rod member being pivotally attached to the second sleeve such that the first, second, and third rod members are movable independently of each other without interference.

19. The joint of claim 17 wherein the first means for providing motive force is a first electric motor, and the second means for providing motive force is a second electric motor.

* * * * *

UNITED STATES PATENT AND TRADEMARK OFFICE
CERTIFICATE OF CORRECTION

PATENT NO. : 4,729,253

DATED : March 8, 1988

INVENTOR(S) : Mark E. Rosheim

It is certified that error appears in the above-identified patent and that said Letters Patent is hereby corrected as shown below:

Column 10, line 65, delete "or" and insert --for--.

Signed and Sealed this

Twelfth Day of July, 1988

*Attest:*

DONALD J. QUIGG

*Attesting Officer*  *Commissioner of Patents and Trademarks*